(12) United States Patent
Sirejacob

(10) Patent No.: US 6,635,305 B2
(45) Date of Patent: Oct. 21, 2003

(54) PROCESS FOR COATING A SILICEOUS SUBSTRATE WITH A SILICON CONTAINING LAYER

(75) Inventor: Gino Sirejacob, Evergem (BE)

(73) Assignee: ICT Coating N.V., Deinze (BE)

( * ) Notice: Subject to any disclaimer, the term of this patent is extended or adjusted under 35 U.S.C. 154(b) by 0 days.

(21) Appl. No.: 09/843,618

(22) Filed: Apr. 26, 2001

(65) Prior Publication Data

US 2003/0026907 A1 Feb. 6, 2003

(51) Int. Cl.⁷ .............................. B05D 1/00; B05D 3/10; A61L 27/00
(52) U.S. Cl. ..................... 427/2.1; 427/2.26; 427/2.27; 427/402; 427/407.1; 427/407.2; 427/337; 427/340; 427/344
(58) Field of Search ............................. 427/402, 407.1, 427/407.2, 2.1, 2.26, 2.27, 337, 340, 344

(56) References Cited

U.S. PATENT DOCUMENTS

| | | | | |
|---|---|---|---|---|
| 5,135,780 A | * | 8/1992 | Kissel | 427/404 |
| 5,550,184 A | * | 8/1996 | Halling | 106/287.12 |
| 6,030,663 A | * | 2/2000 | McClain et al. | 427/389.9 |
| 6,037,008 A | * | 3/2000 | Huang et al. | 427/387 |
| 6,214,931 B1 | * | 4/2001 | Segers et al. | 428/355 AC |
| 6,218,016 B1 | * | 4/2001 | Tedeschi et al. | 424/405 |
| 6,299,905 B1 | * | 10/2001 | Peterson et al. | 156/332 |

* cited by examiner

*Primary Examiner*—Shrive P. Beck
*Assistant Examiner*—Jennifer Kolb Michener
(74) *Attorney, Agent, or Firm*—Darby & Darby

(57) ABSTRACT

A process for coating at least a portion of a face of a siliceous substrate with a silicon containing layer, the process includes at least the following steps:

a treatment step, in which at least the portion of the face of the siliceous substrate is treated with a composition containing at least one biocide, and at least the portion of the face of the siliceous substrate is reacted with a reactive composition for forming a silicon containing layer chemically bound to the siliceous substrate.

27 Claims, No Drawings

PROCESS FOR COATING A SILICEOUS SUBSTRATE WITH A SILICON CONTAINING LAYER

THE STATE OF THE ART

It is known to coat a siliceous substrate with a silicon containing layer. For example, WO 9908784 discloses a method of treating, a solid material to make it hydrophobic.

Another method of coating a siliceous substrate with a silicon layer is disclosed in PCT/BE00/00033.

The content of these two documents are incorporated herein by reference in their entirety.

It has already been proposed to treat the siliceous substrate with HF (hydrofluorhydric acid) before applying the coating.

It has now been discovered that by making various preliminary treatments, as described hereinafter, it was possible to increase drastically the chemical bonds of the silicon layer with the substrate as well as silicon bounds within the layer.

BRIEF DESCRIPTION OF THE INVENTION

The invention relates to a process for coating at least a portion of a face of a siliceous substrate with a silicon containing layer.

The process comprises at least the following steps:

a treatment step, in which at least the portion of the face of the siliceous substrate is treated with a composition containing at least one biocide, and at least the portion of the face of the siliceous substrate is then reacted with a reactive composition for forming a silicon containing layer that is chemically bound to the siliceous substrate.

For example, no drying step is required when applying an amino silane-containing composition on the siliceous substrate.

The reaction with the reactive composition is advantageously carried out at least 10 seconds after the beginning of the treatment step with the biocide containing composition. Preferably, the reaction with the reactive composition is advantageously carried out at least 30 seconds after the beginning of treatment step with the biocide containing composition. For example, the reaction with the reactive composition is advantageously carried out 45 seconds, 1 minute, 2 minutes, 5 minutes, 10 minutes, 20 minutes after the beginning of the treatment step with the biocide-containing composition. Often a time of less than 10 minutes between the beginning of the treatment step and the reaction step is sufficient for obtaining the excellent properties of the coating, as described hereinafter. For example, the drying step (when necessary or desired) of the treated substrate was carried out less than 10 minutes after the beginning of the reaction with the reactive composition.

Advantageously, the biocide composition is selected from the group consisting of aqueous compositions, solvent-containing compositions, alcohol-containing compositions and mixtures thereof. Possible solvents are: organic solvents, such as methanol, ethanol, isopropanol, benzene, dichloro ethane, etc. and mixtures thereof, including with water. However aqueous compositions are preferred for safety reasons.

According to an embodiment, the portion treated with a biocide-containing composition is at least partly washed before being contacted with the reactive composition. The washing step can be carried out by using water, preferably pyrogen free water, solvent, solvent containing compositions, polishing slurries, etc.

Preferably, the portion treated with a biocide containing composition is at least partly dried before being contacted with the reactive composition.

Most preferably, the portion treated with a biocide containing composition is at least partly treated with a means for removing water present on said portion. This water removal can be carried out by a solvent washing (for example by spraying an organic solvent on the treated portion, by dipping the portion in a bath containing one or more organic solvents, etc), by a mechanical removal (wiper, absorbent means, etc), by a low pressure for evaporating the water, by using a gas flow (for example having a low water content, such dried air, the gas having a temperature from 20° C. up to 150° C., or possibly more, and the gas being advantageously without, or substantially without, solid particles or dusts).

Preferably, the water removal is carried out by a washing step with an organic solvent, the solvent being most preferably a solvent suitable when coating the siliceous support or substrate with the reactive composition for applying a silicon containing layer, for example a solvent used in the composition containing the reactive for forming the silicon containing layer.

According to a preferred embodiment, the process comprises at least the following steps a treatment step, in which at least the portion of the face of the siliceous substrate is treated with an aqueous composition containing at least one biocide;

preferably, at least the treated portion is washed;

a drying step, in which the (preferably washed) portion is at least partly dried, and at least the dried portion is reacted with a reactive composition for forming a silicon containing layer chemically bound to the siliceous substrate.

Advantageously, the treated portion layer is washed with an aqueous liquid composition and is dried so that substantially no water remains on the portion of the face to be reacted with the reactive composition. Preferably, the treated portion is free of water before applying the reactive composition for making a silicon containing layer chemically bound to the siliceous substrate.

According to an embodiment, the treated portion layer is washed with an aqueous liquid composition and is dried so that substantially no water remains on the portion of the face to be reacted with the reactive composition. The drying is at least partly carried out by a mechanical removal of the liquid present on said portion.

Preferably, the drying is at least carried out by relative movement of a water absorbing support on the portion of the face.

According to an embodiment, the aqueous composition contains an effective amount of at least a biocide for ensuring an activation of the portion of the face when reacting the portion with the reactive silicon containing composition. In some case, it seems that the use of an aqueous biocide solution with a low biocide content (such as lower than 2% by weight, advantageously lower than 1% by weight, preferably lower than 0.5% by weight) or a high biocide content (higher than 10% by weight) gives the best activation of the siliceous substrate for obtaining an excellent adhesion of the siliceous substrate. However, it has been observed in examples that the use of aqueous biocide solution or liquid composition gives the best adhesion properties of the silicon containing layer on the siliceous substrate.

According to an embodiment, the portion of the face is at least treated with a composition containing at least one metal ion before reacting the portion of the face of the siliceous substrate with the reactive silicon containing composition.

Preferably, at least one of the metal ion is selected from the group consisting of copper, silver, gold, platinum, zinc, magnesium, calcium, sodium, cadmium, rhodium, palladium, salts and mixtures thereof.

Most preferably, the portion of the face is treated with at least a biocide in the presence of a metal ion. The presence of the metal ion, such as $Cu^{++}$, improves the biocide properties of the biocide solution, but also increase the stability of the solution, thus ensuring an even treatment of the surface. For example, at least one of the metal ions is selected from the group consisting of copper, silver, gold, platinum, zinc, magnesium, calcium, sodium, cadmium, rhodium, palladium, salts and mixtures thereof. The solution applied on the glass sheet has, for example, a metal content of less than 0.5%, advantageously less than 0.1% (such as 500 ppm, 300 ppm), preferably less than 0.01% (such as 100 ppm, 80 ppm, 50 ppm, 20 ppm, 10 ppm) or even in some case less.

Other stabilizing agents can also been used. Therefore, according to an embodiment, the portion of the face is treated with at least a biocide in the presence of at least an effective amount of a stabilizing agent.

According to a preferred embodiment, the portion of the face is treated with a (preferably aqueous) solution containing biocide in an effective amount for ensuring a bactericidal activity, and/or with a (preferably aqueous) solution containing biocide in an effective amount for ensuring a microbiocidal activity and/or with a (preferably aqueous) solution containing biocide in an effective amount for ensuring an antifungal activity and/or with a (preferably aqueous) solution containing biocide in an effective amount for ensuring an anti algae activity and/or with a (preferably aqueous) solution containing biocide in an effective amount for ensuring an antifouling activity.

It seems also to be advantageous for the stability of the biocide composition, that the (preferably aqueous) solution containing biocide contains less than 5% by weight of halogenated compounds.

According to possible embodiments, at least one biocide present in the composition is selected from the group consisting of thiazole compounds and their derivatives, isothiasole compound and their derivative, isothiazoline compounds and their derivative, ammonium and their derivative, phosphonium and their derivatives, ammonium-phosphonium compounds and their derivatives, betaine, amido betaine and their derivatives, and mixtures thereof. The biocide can also be the product of the reaction of a biocide with a surfactant, such as a non ionic surfactant.

Preferably, the reactive composition contains reactive silicon-containing reagent bound to at least one fluorine atom, such as a fluoro silane compound, especially those disclosed in PCT/BE00/00033.

The treatment step can be carried out at a temperature comprised between 0° C. and the boiling point of the biocide-containing composition. Advantageously, the treatment step is carried out at a temperature comprised between 30° C. and the boiling point of the biocide containing composition.

Preferred biocides are selected, from the group consisting of isothiazolone, derivatives thereof, compounds having a isothiazolone functions, 3-isothiazolone compound, 5-chloro-2-methyl-3-isothiazolone, 1-methyl-3,5,7-triaza-1-azoniatricyclo (3.3.1.1) deoane chloride, 4,5-dichloro-2-octyl-3isothiazolone, 2-bromo-2-nitropropanediol, 5-bromo-5-nitro dioxane, thiocyanomethylthiobenzothiazole, 4,5-dichloro-2-octyl-3-isothiazolone and 2n-octyl-3-isothiazolone, tetrachloroisophalonitrile, 1,2-benzisothiazolin-3-one, 2-methyl-4,5-trimethylene-4-isothiazolin-3-one, 5-chloro-2-methyl-4isothiazolin-3-one, 2-methyl-4-isothiazolin-3-one, 4-(2-nitrobutyl)morpholine, beta-nitrostyrene ("NS"), beta-bromo-beta-nitrostyrene ("BNS"), methylehloro/isothiazolone ("IZN"), methylenebisthiocyanate ("MBT"), 2,2dibrortmo-3-nitrilopropionamide ("DBNPA"), 2-bromo-2-brornomethyl-glutaronitrile ("BBMGN"), alkyldimethyl-benzylammoniutn chloride ("ADBAC"), and beta-tiitrovinyl furan ("NVF"), 2-methyl-3-isothiazolone, methylene bisthiocyanatc:, p-tolyldiiodotnethyl sulfone, 2-methylthio-4-tertbutylarnino-6-cyclopropylamino-s-tiiazine, N,N-dimethyl-N'-phenyl-(N'fluorodiehloromethylthio)sulfainide, antibiotics, sulfamides, tetracycline, isothiazolone derivatives, N-(cyclo)alkyl-isothiazolone, benzisothiazolin-3-one, etc. and their mixtures.

Other examples of possible biocides which can be possibly mixed with one or more biocides listed here above are:

Bicyclic oxazolidoines and their mixtures, amine-based bactericide, polyacrolein copolymer, 4,4-dinethyloxazolidine, 2((hydroxymethyl)-amino) ethanol, mixtures of 1,2-benzisothiazolone-3-one with one or more amines,.tetrahydro-3,5-dimethyl-2H-1,3,5-thiadiazitie-2-thione. 1.2-benzisothiazolin-3-one, tetrachloroisophthalonitrile, N-cyclopropyl-N-(1,1-dimethylethyl)-6-(methylthio)-1,3;5-triazine-2,4-diamine, mixtures of N-cyclopropyl-N-(1,1-dimethylethyl)-6-(methylthio)-1,3,5-triazine-2,4-diamine with tetrachloroisophthalonitrile, mixtures of tetrachloroisoph-thalonitrile with 3-iodo-2-propynylbutyl carbamate, N-(trichloromethylthio)-phthalimide, 3iodo-2-propynylbutyl carbamate, tetrachloroisophthalonitrile, and their mixture.

In some specific advantageous embodiments, the treatment step is carried out in the presence of at least one free-radical scavenger. Examples of free-radical scavengers are: 3,3-thiodipropionic acid, L-ascorbic acid, D-ascorbic acid, furnaric acid, diethylhydroxylaniine, glutaraldehyde, butyraldehyde, L-tartaric acid, 4-methoxyphenol, propyl gallate and mixtures thereof. The solution to be applied on the glass sheet contains, for example, less than 10% by weight of free-radical scavenger(s), advantageously less than 5%, for example 4%, 3%, 2%, 1%, and preferably less than the biocide active agent content.

According to a specific embodiments, the biocide composition is selected from the group consisting of biocide composition containing at least one surfactant, biocide composition containing at least a biocide bound to a surfactant, biocide composition containing at least one surfactant and an acid, a biocide composition containing at least an acid and at least a biocide bound to a surfactant, a biocide composition containing at least a metal and at least one surfactant, a biocide composition containing at least a metal and at least a biocide bound to a surfactant, a biocide composition containing at least one surfactant, a metal and an acid, a biocide composition containing at least an acid, at least a metal and at least a biocide bound to a surfactant, and mixtures thereof.

The surfactant can be a cationic surfactant, an anionic surfactant, a zwitterionic or amphoteric surfactant or a non-ionic surfactant, or a surfactant having two different moieties, or a mixtures of different surfactants. Non-ionic surfactants are preferred, such as alkanolamides, alkoxylated alcohols, amine oxides, block polymers, castor oil derivatives, ethoxylated amides, ethoxylated amines, ethoxylated and/or alkoxylated alkyl phenols, ethoxylated fatty acids, fatty esters, fluorocarbon based surfactants, glycerol and polycerol esters and their derivatives, glycol, polyglyeol esters, polyoxyethylene glycols, lanolin based derivatives, pentaerythritol derivatives, phytosterol and cholesterol derivatives, siloxanes, sorbitan derivatives, sucrose esters and polyglycosides derivatives, tail oil and rosin derivatives, etc. and mixtures thereof. Specific examples are acetamide monoethanolamide, C12–C19 alkyl amido propyl amine oxide, alkanolamide (such as coconut and, linoleic), alkoxylated alkanolamides, cocamide diethanolamide; cocamide monoethanolamide, coco diethanolamide, cocomonoethanolamide, coconut diethanolamide, alcohol alkoxylate, alkoxylated cetyl ether, alkoxylates, alkyl alcohol polypropylene glycol ether, fatty alcohol alkoxylate (for example with 2 to 12 propylene oxide groups), C 12–C 14 fatty alcohol with 2 to 10 ethylene oxide groups and/or 3 to 8 propylene oxide groups, lauramine oxide, myristamine oxide, octamine oxide, tearyl amine oxide, palmitamine oxide, Block Ethylenpoxide/propyleneoxide copolymer, ethoxylated natural oils and fats, ethoxylated triglycei-ides, fatty acid mono and diesters, polyoxyethylene castor oil, polyoxyethylene castor oil ether, ethoxylated alcohols (with 2 to 20 ethylene oxide groups and/or propyleneoxide groups), fatty amine ethoxylated, alkyl phenol ethoxylated, alkyl phenol polyglycol ether (with 2 to 8 ethylene oxide groups and/or propylene oxide groups), fatty acid polyethylene glycol ester, disteaiyl phthalate, butyl stearate, eoco caprilate, diisopropyl sebacate, etc.

The acid is for example a mineral acid (HCI, H2SO4, etc,), an organic acid (citric acid, formic acid, glycolic acid, etc.), and mixtures thereof. The pH of the composition is for example comprised between 0.5 and 10, advantageously between 3 and 9, such as between 5 and 8.5. The acid content of the composition is for example such that after dilution with water and/or solvent(s), the pH is comprised between 1 and 9.

The surfactant content of the biocide composition or blend is for example comprised between 0.01% and 30% by weight, for example 0.1%, 0.2%, 0.5%, 0.8%,1.0%,5%, 10%,20%.

The weight ratio surfactant/biocide is for example comprised between 0.5 and 1000, advantageously between 1 and 500, and preferably between 10 and 200, such as 20,50, 70, 100, 125, 150.

The composition may also contain one or more buffer, if necessary.

DESCRIPTION OF EXAMPLES

In the examples which follow, various coatings have been applied on siliceous substrates after a pretreatment step.

Example No. 1 of a Pretreatment Step

A glass sheet with a thickness of 5 mm was dipped in a biocide solution containing 0.2% by weight of a mixture of 5-chloro-2-methyl-3-(2H)-isothiazolone and 2-methyl-3-(2H)-')3-isothiazolone and 0.05% glutaraldehyde, the weight ratio 5-chloro-2-methyl-3-isothiazolone/2-inethyl-3-isothiazolone being 1.

After 5 minutes the glass sheet was removed and was dried with an absorbing paper so that the glass sheet was substantially free of water.

Said glass sheet was then coated as in examples of coating.

Example No. 2 of a Pretreatment Step

Example 1 was repeated, except that the glass sheet was wetted with a sponge containing the biocide solution.

Example No. 3 of a Pretreatment Step

Example 1 was repeated, except that the biocide solution was sprayed on the glass sheet.

Example No. 4 of a Pretreatment Step

Example 1 was repeated, except that the biocide solution was brushed on the glass sheet.

Example No. 5 of a Pretreatment Step

Prior to the treatment of the glass sheet with the biocide solution, the glass sheet was dipped in an acid bath (HF).

Example Nos. 6–12 of a Pretreatment Step

Examples 1–5 of pretreatment steps have been repeated, but using a biocide solution having respectively a biocide content of 0.5% by weight, 0.25% by weight, 0.1% by weight, 0.05% by weight, 0.01% by weight, 10% by weight and 20% by weight.

According to tests, it appeared that the adhesion of a silicon-containing layer on the glass sheet was better when using less than 0.5% by weight biocide, preferably less than 0.25% by weight.

Example Nos. 13 to 39 of a Pretreatment Step

Examples 1 to 12 have been repeated but using different biocide compositions. The biocide compositions are given in the following table. In said table, Biocides B used are:

BA: 5-chloro-2-methyl-3-isothiazolone,

BB: 1-methyl-3,5,7-triaza-1-azoniatricyclo(3.3.1.1) decane chloride,

BC: 4,5-dichloro-2-octyl-3-isothiazolone,

BD: 5-bromo-S-nitro dioxane,

BE: 4,5-dichloro-2-octyl-3-isothiazolone and 2n-octyl-3-isothiazolone,

BF: tetrachloroisophalonitrile,

BG: 2-methyl-4,5-trimethylene-4-isothiazolin-3-one,

BH: 5-chloro-2-methyl-4-isothiacolin-3-one,

BI: 2-methyl-4-isothiazolin-3-one,

BJ: 4-(2-nitrobutyl)morpholine,

BK: beta-nitrostyrene,

BL: beta-bromo-beta-nitrostyrene,

BM: methylchloro/isothiazolone,

BN: methylenebisthiocyanate,

BO: 2,2-dibromo-3-nitrilopropiona.mide,

BP: 2-bromo-2-bromomethyl-glutaronitrile,

BQ: alkyldimethylbenzylamtnociium chloride,

BR: beta-nitrovinyl furan,

BS: 2-methyl-3-isothiazolone,

BT: p-tolyldiiodomethyl sulfone,

BU: 2-methylthio-4-tert-butylamino-6-cyclopropylamino-s-triazine,
BV: N,N-dimethyl-N'-phenyl-(N'-fluorodichloroinethylthio)sulfamide,
BW: sulfamides,
BZ: thiocyanomethylthiobenzothiazole,
BZ 1: 2-bromo=2-nitropropane-1,3-diol,
BZ2: benzisothiazolin-3-one
Metal cation are:
Cu: Copper
Ag: silver
Free-radical scavenger F are:
F1: 3,3-thiodipropionic acid,
F2: L-ascorbic acid,
F3: D-ascorbic acid,
F4: fumaric acid,
F5: diethylhydroxylamine,
F6: glutaraldehyde,
F7: butyraldehyde,
F8: L-tartaric acid,
F9: 4-inethoxyphenol,
F10: propyl gallate In said table, the % of compounds are % by weight or expressed in ppm in the solution applied on the glass sheet.

| biocide solution | biocide B | metal cation | Free-radical scavenger |
|---|---|---|---|
| 1 | 0.5% BA | 50 ppm Cu | |
| 2 | 0.5% BA | 50 ppm Cu | 0.01% F6 |
| 3 | 0.3% BA + 0.1% BB | 50 ppm Ag | 0.01% F6 |
| 4 | 0.2% BA + 0.2% BC | | 0.3% F1 |
| 5 | 0.4% BD + 0.4% BE | 50 ppm Cu | 0.2% F2 |
| 6 | 0.5% BF + 0.5% BG | | 0.5% F3 |
| 7 | 0.5% BA | 50 ppm Ag | |
| 8 | 0.5% BH + 0.5% BI | | 0.5% F4 |
| 9 | 0.1% BA + 0.6% BJ | | |
| 10 | 0.2% BK + 0.2% BL + 0.2% BA | | 0.2% F5 |
| 11 | 0.8% BM 1.0% BN | | |
| 13 | 0.4% BO + 0.4% BA | 50 ppm Cu | 0.5% F7 0.2% F8 |
| 14 | 0.3% BP + 0.3% BQ | 50 ppm Cu | 0.3% F9 |
| 15 | 0.1% BP + 0.1% BQ + 0.1% BR + | 50 ppm Cu | 0.4% F10 |
| 16 | 0.5% BS | 100 ppm Cu | |
| 17 | 0.5% BT | 10 ppm Ag | |
| 18 | 0.5% BV | 10 ppm Cu | |
| 19 | 0.5% BW | 50 ppm Cu | |
| 20 | 0.5% BZ 0.5% BZ1 | 100 ppm Ag 200 ppm Cu | |
| 22 | 0.4% BA | 10 ppm Cu | 0.1% F6 |
| 23 | 0.3% BA + 0.2% BS | 50 ppm Cu | 0.2% F6 |
| 24 | 0.5% BA + 0.2% BZ1 | 20 ppm Ag | 0.3% F6 |
| 25 | 0.7% BA + 0.2% B1 | 100 ppm Cu | 0.5% F6 |
| 26 | 0.8% BA + 0.2% BZ2 | 10 ppm Ag + 10 ppm Cu | |
| 27 | 1.0% BA | 20 ppm Cu + 5 ppm Ag | 0.5% F6 |

The so treated glass sheet have been covered by a fluoro silane layer as disclosed in PCT/BE00/00033.

Further Examples of Pretreatment

The preceding examples have been repeated, except that the biocide compositions further contain 7% by weight of a non ionic surfactant such as cocoamide diethanolamide and myristamine oxide and distearyl phthalate, and at least an acid (such as glycolic acid, citric acid) for adjusting the pH to about 2–4. Some of said compositions had the form of a gel or gelatinous product.

Example No. 1 of an Application Layer

A first composition A has been prepared by adding absolute ethanol and diethyl phthalate to a solution of silane ether (60% silane/40%ethanol) of the following formula

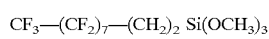

in ethanol.

The said first composition A which was substantially water free, was an ethanol solution containing about 4% by weight of the said silane ether and 1 by weight diethyl phthalate. The first composition was placed in a first glass container.

A second composition B was prepared by mixing concentrated hydrochloric acid (37%), ethanol, and diethyl phthalate. The said composition contains 94% by weight ethanol, 4% by weight concentrated hydrochloric acid, 1% diethyl phthalate and 1% diethylene amine. The composition had thus a water content lower than about 2.5%. The second composition was placed in a second container.

30 minutes before applying the composition on the treated and dried glass sheet, the content of said first and second containers have been agitated and thereafter mixed together in a weight ratio of 1 part of the first composition per 1 part of the second composition. The pH of the mixture was measured by using a Multi-meters pocket "Multiline P4" of WTM sold by VEL (Leuven, BELGIUM) provided with a LiCl electrode (open sleeve electrode, pH Flushtrode with LiCI) of HAMILTON (USA) sold by VEL. Such an electrode is a known electrode for measuring a pH in a polar medium, as well as in a nonpolar solvent. Even if the pH is measured preferably by using this electrode, other electrodes suitable for measuring pH in a polar solvent can be used. The pH was measured at 25° C., even if the Multi-meters apparatus was provided with a system for compensating the variation of the pH in function of the temperature. The apparatus was calibrated by using buffers having respectively a pH of 1.00, 2.00, 3.00, 4.01, 6.99 and 8.98. According to this method of determination of the pH, the pH of the mixture was lower than 0.5 (a negative measure was even determined).

The mixture was then applied on the pretreated glass sheet by dipping the glass sheet in a bath containing the mixture. After dipping, the excess of solution on the glass sheet was removed by rubbing a wool fabric against the glass sheet. Thereafter, the glass sheet was washed with an aqueous alcohol solution.

The so treated glass sheet was then heated at 130° C. during 30 minutes for drying and curing the layer with the substrate (formation of covalent oxygen bounds between the siliceous substrate and the silane layer).

The so obtained layer was a mono layer, having a thickness of lower than 1 p.m (thickness corresponding substantially to the length of $CF_3$—$(CF_2)_7$—$(CH_2)_2$ Si).

Tests have been made on the treated glass in order to determine its properties. The results of these tests are the followings:

Resistance Tests

For these tests, two drops of a fluid have been applied for 1 minutes on the coated glass. A first drop has been removed after a rubbing with a paper cloth and thereafter wiped with cotton, while a second drop was removed without rubbing with a paper cloth and thereafter wiped with cotton. The resistance of the coating to the fluid was determined by checking for tackiness, by examining the crazing, by examining the loss of transparency and hydrophobicity.

The results of these examinations are that the coating has a resistance to various chemicals, namely:

Resistance to boiling water

Resistance to non abrasive soap solution (2% soap content)

Resistance to non abrasive concentrated soap solution (100% soap)

Resistance to alcohol (absolute)

Resistance to isopropanol

Resistance to isoparaffinic hydrocarbon (isopar c)

Resistance to boiling acetone Resistance to diacetonalcohol Resistance to methyl ethyl ketone (MEK) Resistance to sec. Butanol Resistance to concentrated HCl (37%) Resistance to sulphuric acid (99%) Resistance to diluted NaOH (resitance of at least 1 minute after applying at 25° C. an aqueous solution containing 5% NaOH)

Resistance of at least 1 minute to an aqueous solution containing 25% NaOH

Resistance of at least 1 minute to an aqueous solution containing, 25% KOH

Resistance to nitric acid (68%) Resistance to formic acid (99%) Resistance to gazoline—Resistance to guano.

Furthermore, the layer had a resistance for at least 24 hours against the action of concentrated phosphoric acid (99%) at 25° C., as well as at the boiling temperature.

Water-repellent Tests

The layer was still water-repellent after 3000 hours. For said test water is running continuously on the coating from a high of 50 cm, the glass plate being positioned at an angle of 45° with respect to the horizontal. The layer has the following characteristics: abrasion resistance, hydrophobicity, oilyphobicity, low friction coefficient, clear and transparent appearance, light transmission equivalent to the light transmission of the glass plate before treatment.

Surface Energy Test

Surface energy lower than 12 dynes/cm (6–8 dynes/cm)

Taber Abraser Test

A delta haze of less than 0.1% was measured by the method ASTM D 1044-94, using a Taber abraser under the conditions where the abrading wheel was a CS-10F wheel, the load was 500 g and the number of rotations was 1,000.

Adhesion Test

The results of this test is that there is a good adhesion of the layer or coating, even after immersion of the glass plate in boiling water for 1 hour. When using the method disclosed in DIN 53151 the edges of the cuts were completely smooth and none of the square of the lattices of the cuts is detached, showing therefore an excellent adhesion.

UV Test

The UV resistance was determined by using the test Q.U.V. FS 40, with successive cycles of 8 hours UV B radiation at 70° C. and 4 hours condensation at 50° C. After 1000 hours, the coating was still water repellent.

Mechanical Test

When using said glass as a car window, it appears that there were less impacts of insects and other dirt, that there was a kind of jumping effect for the particles or insects on the windows, that the cleaning of the window was easier and that a perfect cleaning could be reached with a wiper blade provided with a fluoro or fluorinated layer or coating.

It appears also that in the same cold weather environment (temperature of −5° C.), no freeze was formed on the glass sheet of the invention, while a freeze layer was formed on the non treated glass sheet. The glass sheet of the invention has thus anti freeze properties.

Washability Test

The glass substrate pretreated as in example 1 of a pretreatment step and provided with the fluoro coating was submitted to a washability test. For said test, the norms ASTM D2486 and 4213 and DIN 53778 have been amended so as to have faster results. The amendments made to said norms are: use of metallographic silicon carbide paper P600 instead of the scotch 7448 or brush as disclosed iii the norms, use of a heavier support with a total weight of 750 g, the relative abrasion resitance was not measured, use of demineralized water instead of non abrasive medium, and measuring of a contact angle after the test.

As a hydrophobic coating needs to have a contact angle higher than 80°, the number of abrasion cycles for reaching said angle was thus determined and was compared with a glass sheet not pretreated as in example 1 but provided with a fluoro coating.

The results of said test is that the glass sheet pretreated with the biocide composition and coated still has a contact angle higher than 80° after 55,000 abrasion cycles, while the glass sheet not pretreated with the biocide composition had a contact angle of less than 80'-after about. 1,000 abrasion cycles. This test shows that the biocide pretreatment increases drastically the abrasion resistance of the coating and the hydrophobic character of the coating and therefore the washability of the coating.

The excellent properties of the glass sheet were kept during a time corresponding to a car travel of more than 40,000 lam. Furthermore, the glass sheet had a resistance against fungi, algae, bacteria, etc., as well as a resistance to the adhesion of fungi, algae, bacteria, etc., whereby the clean aspect of-the glass sheet was still improved.

Example No. 2 of an Application Layer

Example 1 was repeated, except that, instead of dipping, the composition was sprayed on a face of the glass sheet.

Example No. 3 of an Application Layer

Example 1 was repeated, except that, instead of dipping, the composition was brushed on a face of the glass sheet.

Example No. 4 of an Application Layer

Example 1 was repeated except that no heat treatment was carried out at 130° C. The drying was carried out at room temperature and was considered as finished after 24 hours.

The layer had the same properties as the layer of example 1, except that the delta haze was comprised between 0.2 and 0.3.

Example No. 5 of an Application Layer

Example 1 was repeated, except that a solution of silane ether of the following formula $$CF—(CF_2)_5—(CH_2)_2\ Si(OCH_3)_3$$

was used.

Example No. 6 of an Application Layer

Example 1 was repeated, except that the following compositions A and B were used.

| Example | % weight | 6A | 6B | 6C | 6D | 6E | 6F |
|---|---|---|---|---|---|---|---|
| Composition A | | | | | | | |
| | DEP | 2.0 | 2.0 | 2.0 | 1.0 | 1.0 | 1.0 |
| | Silane | 3.0 | 4.0 | 2.0 | 2.0 | 2.0 | 3.0 |
| | methanol | | | | 23.0 | 74.0 | |
| | ethanol | 95.0 | 94.0 | 96.0 | 74.0 | 23.0 | 50.0 |
| | propanol | | | | | | 46.0 |
| Composition B | | | | | | | |
| | DEP | 1.0 | 1.0 | 1.0 | 1.0 | | |
| | Ethanol | 97.0 | 96.0 | 98.0 | 82.0 | 98.0 | 80.0 |
| | HCI | 2.0 | 3.0 | 1.0 | 2.0 | 2.0 | 2.0 |
| | methanol | | | | 15.0 | | 18.0 |

Silane: silane ether used in example 1 DEP: diethyl phthalate

HCI: concentrated hydrochloric acid (37% HCI—63%water)

Ethanol: absolute ethanol

Example No. 7 of an Application Layer

A composition containing ethanol, HCI, and DEP (diethyl phthalate) has been prepared by mixing 8 parts by weight HCl (37% aqueous hydrochloric acid solution) with 90 parts by weight ethanol (absolute), and by adding to said mixture 2 parts by weight DEP. The composition C was placed in a container.

A solution of silane ether (60%) of the following formula $$CF_3—(CF_2)_7—(CH_2)_2\ Si(OCH_3)_3$$

in ethanol was placed in another container.

30 minutes before applying the silane onto the treated glass plate, the silane ether solution was mixed with additional ethanol (absolute) so as to reduce the silane ether content to 1%. 1 part by weight of the said silane ether mixture was then mixed with 0.1 part by weight of the 8% hydrochloric (aqueous solution containing 37% HCl) composition.

The so obtained composition was applied on the glass sheet as in example 1.

Example No. 8 of an Application Layer

Example 1 was repeated, except that a solution of silane ether of the following formula $$CF_3—(CF_2)_7\ Si(OCH_3)_3$$

was used.

Example No. 9 of an Application Layer

Example 1 was repeated, except that a solution containing 2% by weight of silane ether of the following formula $$CF_3—(CF_2)_5—(CH_2)_2\ Si(OCH_3)_3$$

and 2% by weight of silane ether of the following formula $$CF_3—(CF_2)_7—(CH_2)_2\ Si(OCH_3)_3$$

was used.

Example No. 10 of an Application Layer

Various kits similar to the kits of example 6 have been prepared, except that the mixing weight ratio composition B/composition A was greater than 1.1, i.e. more than one part by weight of composition B was mixed with one part of the composition A.

The following table gives the compositions A and B of the kits which were prepared.

| Example | % weight | 10 A | 10 B | 10 C | 10 D | 10 E | 10 F |
|---|---|---|---|---|---|---|---|
| Composition A | DEP | 0.5 | 1.0 | 2.0 | 1.0 | 40.0 | 0.5 |
| | Silane | 60.0 | 60.0 | 70.0 | 60.0 | 60.0 | 70.0 |
| | methanol | | | | 10.0 | | |
| | ethanol | 39.5 | 39.0 | 28.0 | 29.0 | | 20.0 |
| | propanol | | | | | | 9.5 |
| Composition B | DEP | 1.0 | 1.0 | 1.0 | 1.0 | | 3.0 |
| | Ethanol | 97.0 | 96.0 | 98.0 | 82.0 | 98.0 | 95.0 |
| | HCl | 2.0 | 3.0 | 1.0 | 2.0 | 2.0 | 2.0 |
| | methanol | | | | 15.0 | | |
| Mixing ratio Part of composition B (g) per part of composition A (g) | | 50:1 | 100/1 | 80/1 | 20:1 | 50:1 | 50:1 |

Silane: silane ether used in example 1

DEP: diethyl phthalate

HCl: concentrated hydrochloric acid (37% HCl—63% water)

Ethanol. absolute ethanol

In the kits of example 10, the silane containing composition had a high silane concentration, whereby the said silane containing composition was mixed with a high amount of composition B. Preferably the mixed composition to be applied on the siliceous substrate has a silane-silanol content of about 2% by weight.

Example No. 11 of an Application Layer

A composition was prepared by dissolving a silane of the formula $$CF_3—(CF_2)_7—(CH_2)_2\ Si(OCH_3);$$

in ethanol, and by mixing with the mixture diethyl phthalate and acetic anhydride. The so obtained solution had the following composition: 2% silane, 1% diethyl phthalate, 2% acetic anhydre and 95% ethanol. The said composition was placed in a container.

30 minutes before applying the solution onto a siliceous substrate (glass plate, 2 nil water was added and mixed to 100 ml of the solution.

Other anhydrides can be used in example 11, such as maleic anhydride, etc.

Although the examples of application nos. 1 to 10 described hereinabove contain only HCl, it is clear that the process according to the invention can be carried out in presence of a mixture of HCl with another acid, preferably not attacking the glass surface, such as sulphuric acid, nitric acid, organic acids, chlorinated organic acids, for example acetic acid, formic acid, glutaric acid, maleic acid, chloro acetic acid, dichloro acetic acid, chloro formic acid, etc.

If required or necessary, previously treated glass or a siliceous substrate according to a process of the invention, can be coated again. Such a further coating can be advantageous in case the fluoro silane layer and/or the face of the substrate provided with the fluoro silane layer have been partially or completely damaged, so as to restore the properties of the siliceous substrate of the invention.

Examples of other possible fluorinated silane suitable to be used in the process of the invention are fluorinated silanes of the group fluoroaliphatic polymeric esters, fluorinated alkyl polyoxyethylene ethanols, and fluorinated silane of the general formula:

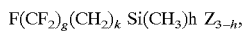

wherein Z is chloro, hydroxy, methoxy or ethoxy, g is an integer selected from the integers 1 to 10, k is the integer 0,1 or 2, and h is the integer 0, 1 or 2.

Examples of such fluorinated silanes include ti-ifluoroacetoxypropyl tri-(Ci—C-,)alkoxysilanes, 3-(heptafluoroisopropoxy)propyltrichlorosilane, 3(heptatluoroisopropoxy) propyltriethoxysilane, N-(3-triethoxysilylpropyl) perfluorooctanoatnide, N-(3-triethoxysilylpropyl)l)erfluoro(2,5 -dimemethyl-3, 6dioxanonanoyl)amide, (tridecafluoro-1,1,2,2-tetrahydrooctyl)-1dimethylchlorosilane, (tridecafluoro-1,1, 2,2-tetrahydrooctyl)-1methyldichlorosilane, (tridecafluoro-1,1,2,2-tetrahydrooctyl)-1-trichlorosilane, tridecafluoro-1,1, 2,2-tetrahydrooctyl-1-triethoxysilane, 3,3, 3trifluoropropyldimethylchlorosilane, (3,3,3trifluoropropyl)methydichlorosilane, (3,3,3trifluoropropyl)methyldimethoxysilane, (3,3,3trifluoropropyl)methyldimethoxysilane, (3,3,3-trifluoropropyl)trichlorosilane, (3,3,3-trifluoropropyl)trimethoxysilane, 1H,1H,2Ff,2Hperfluoroalkyltriethoxysilane, 1.H,1H,2H, 2Hperfluorodecyldimethylchlorosilane, 1 H,1 H,2H, 2Hperfluorodecylmethyldichlorosilane, 1H,1'1-H,2H,2H-perfluorotrichlorosilane, 1H,1H,2H,2H-perfluorotriethoxysilane, 1H,1H,2H, 2Hperfluorooctylmethyldichlorosilane, 1H,1H,2H, 2Hperfluorooctyltrichlorosilane, and 1H,1H,2H,2H= perfluorooctyltriethoxysilane.

However, preferably, the silanes used in the process of the invention are silanes of the above mentioned formula but with k equal to 2 and h equal to 0, and with g an integer from 4 to 9, and mixtures of such silanes.

In the above-described examples, the coating was carried out by dipping, brushing and spraying. It is clear that any other conventional coating methods, such as spin coating, roll coating, curtain coating, etc., are suitable for applying the silane layer on the substrate.

It is clear that prior to applying the biocide composition onto the substrate, the substrate is advantageously treated with a solution for removing possible coatings (silane, silicone oil, glue, etc.) present on the surface. Preferably the substrate is treated with a solution which does not degrade the glass substrate. For example; the glass substrate is first treated by means of a solution containing HCl, citric acid, phosphoric acid, polishing slurries, etc. or a solution "SIL-STRIP:LIQUID"© of PENN-WHITE (UK) so as to remove impurities attached to the substrate.

The curing is preferably carried out by subjecting the silane layer to a heat treatment, for example between 75 and 150° C., preferably between 95 and 140° C. However, other curing methods are possible, such as infrared, ultraviolet, gamma or electron radiation.

In the present specification, reference is made to the measurement of a pH by means of a LiCl electrode provided with an open sleeve (flushtrode of Hamilton, USA). The potential measured by using this electrode is the potential measured against a reference electrode, namely an Ag/AgCl reference electrode, with use of I molar LiCl in ethanol as electrolyte. This electrode is known as suitable for measuring a pH in a partially aqueous media, as well as in a polar non-aqueous media. It is obvious that other electrodes suitable for determining a pH in a non-aqueous or substantially non-aqueous media can also be used for determining the pH.

What I claim is:

1. A process for coating at least a portion of a face of a siliceous substrate with a silicon-containing layer, comprising the steps of:

treating the portion with an aqueous composition including at least one biocide selected from the group consisting of: thiazole compounds and derivatives, isothiasole compounds and their derivatives, isothiazoline compounds and their derivatives, ammonium and its derivatives, phosphonium compounds and their derivatives, and ammonium-phosphonium compounds and their derivatives, and at least one free-radical scavenger selected from the group consisting of: 3,3-thiodipropionic acid, L-ascorbic acid, D-ascorbic acid, fumaric acid, diethylhydroxylamine, glutaraldehyde, butyraldehyde, L-tartaric acid, 4-methoxyphenol, propyl gallate and mixtures thereof, said aqueous composition including an amount of biocide sufficient for ensuring an activation of the portion; then treating the portion with a means for removing water present on the portion treated with the aqueous biocide containing composition, and then reacting the portion with a reactive composition, the reactive composition forming a silicon-containing layer chemically bound to the siliceous substrate.

2. The process of claim 1, wherein the portion treated with the biocide-containing composition is at least partly washed before the beginning of the reacting step.

3. The process of claim 1, wherein the portion treated with the biocide-containing composition is at least partly dried before the beginning of the reacting step.

4. The process of claim 1, including the step of washing the portion treated with the aqueous biocide-containing composition, wherein water present on the portion treated with the biocide-containing composition is removed, the washing step including use of an organic solvent.

5. The process of claim 1, wherein the biocide-containing composition includes at least one metal ion.

6. The process of claim 5, wherein at least one of the metal ions is selected from the group consisting of: copper, silver, gold, platinum, zinc, magnesium, calcium, sodium, cadmium, rhodium, palladium, and mixtures thereof.

7. The process of claim 1, wherein the portion of the face is treated with the biocide-containing composition in the presence of a metal ion.

8. The process of claim 7, wherein the metal ion is selected from the group consisting of: copper, silver, gold, platinum, zinc, magnesium, calcium, sodium, cadmium, rhodium, palladium, and mixtures thereof.

9. The process of claim 1, wherein the treating step occurs in the presence of an effective amount of a stabilizing agent, before reacting the portion with a reactive silicon-containing composition.

10. The process of claim 1, wherein the biocide-containing composition includes an effective amount of biocide for ensuring a bactericidal activity.

11. The process of claim 1, wherein the biocide-containing composition includes an effective amount of biocide for ensuring a microbiocidal activity.

12. The process of claim 1, wherein the biocide-containing composition includes an effective amount of biocide for ensuring an antifungal activity.

13. The process of claim 1, wherein the biocide-containing composition includes an effective amount of biocide for ensuring an antialgae activity.

14. The process of claim 1, wherein the biocide-containing composition includes an effective amount of biocide for ensuring an antifouling activity.

15. The process of claim 1, wherein the biocide-containing composition includes less than 5% by weight of halogenated compounds.

16. The process of claim 1, wherein the reactive composition includes reactive silicon having reagent bound to at least one fluorine atom.

17. The process of claim 16, wherein the reactive composition is a composition for forming a fluoro silane layer.

18. The process of claim 1, wherein the treating step with the aqueous biocide containing composition is performed at a temperature between 0° C. and the boiling point of the biocide-containing composition.

19. The process of claim 1, wherein the treating step with the aqueous biocide containing composition is performed at a temperature between 30° C. and the boiling point of the biocide-containing composition.

20. The process of claim 1, wherein the aqueous biocide-containing composition includes at least one biocide compound selected from the group consisting of: 3 isothiazolone compound, 5-chloro-2-methyl-3-isothiazolone, 4,5-dichloro-2octyl-3-isothiazolone, thiocyanomethylthiobenzothiazole, 4,4-dichloro-2octyl-3isothiazolone 2n-octyl-3-isothiazolone, 1,2-benzisothiazolin-3-one, 2-methyl-4,5-trimethylene-4-isothiazolin-3-one, 5-chloro-2-methyl-4-isothiazolin-3-one, 2-methyl-4-isothiazolin-3-one, methylchloro/isothiazolone ("IZN"), alkyldimethylbenzylammonium chloride ("ADBAC"), 2-methyl-3-isothiazolone, isothiazolone derivatives, N-(cyclo)alkyl-isothiazolone, and their mixtures.

21. The process of claim 1, wherein the biocide-containing composition includes at least one additive selected from the group consisting of: surfactants, biocide bound to a surfactant, acids, metals, and mixtures thereof.

22. The process of claim 1, wherein the reacting step is performed at least 30 seconds after the beginning of the treating step.

23. The process of claim 1, wherein the reacting step is performed at least 45 seconds after the beginning of the treating step.

24. A process for coating at least a portion of a face of a siliceous substrate with a silicon containing layer, the process comprising the steps of:

treating the portion with an aqueous composition containing at least one biocide selected from the group consisting of: thiazole compounds and derivatives, isothiasole compounds and their derivatives, isothiazoline compounds and their derivatives, ammonium its derivatives, phosphonium compounds and their derivatives, and ammonium-phosphonium compounds and their derivatives, and at least one free-radical scavenger selected from the group consisting of: 3,3-thiodipropionic acid, L-ascorbic acid, D-ascorbic acid, fumaric acid, diethylhydroxylamine, glutaraldehyde, butyraldehyde, L-tartaric acid, 4-methoxyphenol, propyl gallate and mixtures thereof, said aqueous composition including an amount of biocide sufficient for ensuring an activation of the portion; then washing the treated portion; then drying, at least partly, the washed portion, and then reacting the dried washed portion with a reactive composition for forming a silicon containing layer chemically bound to the siliceous substrate.

25. The process of claim 24, in which the portion treated with the biocide-containing composition is washed with an aqueous liquid composition and is, thereafter, dried so that substantially no water remains on the portion of the face which is, thereafter, reacted with the reactive composition.

26. The process of claim 24, in which the portion treated with the biocide-containing composition is washed with an aqueous liquid composition and is, thereafter, dried so that substantially no water remains on the portion of the face which is, thereafter, reacted with the reactive composition, wherein the drying is at least partly carried out by a mechanical removal of the liquid present on the portion.

27. The process of claim 26, wherein the step of drying includes the use of relative movement of a water absorbing support on the portion of the face.

* * * * *